(12) United States Patent
Guan et al.

(10) Patent No.: US 11,374,716 B2
(45) Date of Patent: Jun. 28, 2022

(54) COMMUNICATION METHOD AND COMMUNICATION APPARATUS

(71) Applicant: HUAWEI TECHNOLOGIES CO., LTD., Guangdong (CN)

(72) Inventors: Peng Guan, Chengdu (CN); You Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 16/674,683

(22) Filed: Nov. 5, 2019

(65) Prior Publication Data

US 2020/0067674 A1    Feb. 27, 2020

Related U.S. Application Data

(63) Continuation of application No. PCT/CN2018/115602, filed on Nov. 15, 2018.

(30) Foreign Application Priority Data

Nov. 17, 2017 (CN) .......................... 201711147082.2
May 18, 2018 (CN) .......................... 201810480678.2

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0695* (2013.01); *H04L 1/0026* (2013.01);
(Continued)

(58) Field of Classification Search
CPC ... H04L 5/0051; H04L 1/0026; H04L 5/0007; H04L 5/005; H04L 27/2611;
(Continued)

(56) References Cited

U.S. PATENT DOCUMENTS

2009/0022235 A1*  1/2009  Zhang ................... H04L 5/0053
                                                    375/260
2010/0303034 A1   12/2010  Chen et al.
(Continued)

FOREIGN PATENT DOCUMENTS

CN       101447815 A      6/2009
CN       101938302 A      1/2011
(Continued)

OTHER PUBLICATIONS

Office Action issued in Chinese Application No. 201810480678.2 dated Feb. 2, 2021, 18 pages (with English translation).
(Continued)

*Primary Examiner* — Christopher M Brandt
(74) *Attorney, Agent, or Firm* — Fish & Richardson P.C.

(57) ABSTRACT

This application discloses a communication method and a communications apparatus. The method includes: receiving, by a terminal device, reference signal configuration information sent by a network device, where the reference signal configuration information includes at least one of the following information: a beam sweeping type and a reference signal beam indication; receiving, by the terminal device, a reference signal and data that are sent by the network device; and determining, by the terminal device based on the reference signal configuration information, whether data can be mapped onto another resource element that is located on a same orthogonal frequency division multiplexing (OFDM) symbol as the reference signal. The corresponding apparatus is further disclosed. According to technical solutions provided in this application, reliable data reception can be implemented.

8 Claims, 11 Drawing Sheets

(51) Int. Cl.
  *H04L 1/00*    (2006.01)
  *H04W 16/28*   (2009.01)
  *H04W 72/04*   (2009.01)

(52) U.S. Cl.
  CPC .......... *H04L 5/0007* (2013.01); *H04W 16/28* (2013.01); *H04W 72/046* (2013.01)

(58) Field of Classification Search
  CPC ... H04L 5/0048; H04L 5/0094; H04L 5/0044; H04L 5/0023; H04L 5/00; H04L 27/2602; H04L 5/0053; H04B 7/0695; H04B 7/088; H04B 7/0408; H04B 7/0626; H04W 16/28; H04W 72/046
  See application file for complete search history.

(56) References Cited

U.S. PATENT DOCUMENTS

| | | |
|---|---|---|
| 2013/0039345 A1 | 2/2013 | Kim et al. |
| 2013/0182594 A1 | 7/2013 | Kim et al. |
| 2016/0192338 A1 | 6/2016 | Benjebbour et al. |
| 2016/0301511 A1 | 10/2016 | Yoon et al. |
| 2016/0337056 A1 | 11/2016 | Frenne et al. |
| 2017/0026156 A1 | 1/2017 | Thomas et al. |
| 2017/0238311 A1* | 8/2017 | Hooli ................ H04W 74/0808 370/329 |
| 2017/0311276 A1* | 10/2017 | Tsai ..................... H04W 48/16 |

FOREIGN PATENT DOCUMENTS

| | | |
|---|---|---|
| CN | 102598532 A | 7/2012 |
| CN | 103546398 A | 1/2014 |
| CN | 103875191 A | 6/2014 |
| CN | 105210306 A | 12/2015 |
| CN | 105684341 A | 6/2016 |
| CN | 106169948 A | 11/2016 |
| CN | 106793125 A | 5/2017 |
| CN | 106911370 A | 6/2017 |
| CN | 106936558 A | 7/2017 |
| CN | 106982184 A | 7/2017 |
| CN | 107306147 A | 10/2017 |
| CN | 107852294 A | 3/2018 |
| EP | 3451725 A1 | 3/2019 |
| EP | 3471328 A1 | 4/2019 |
| WO | 2014208141 A1 | 12/2014 |
| WO | 2015199414 A1 | 12/2015 |
| WO | 2019215328 A1 | 11/2019 |

OTHER PUBLICATIONS

Ericsson, "Performance of beam management without beam indication",3GPP TSG RAN WG1 Meeting 90bis, R1-1718742, Prague, CZ, Oct. 2017, 10 pages.
Zte et al., "On CSI-RS for CSI acquisition and beam management",3GPP Draft, R1-1717432, XP051340621, Oct. 8, 2017, XP051340621, 6 pages.
LG Electronics,"On SRS design and related operations",3GPP TSG RAN WG1 Meeting NR #90bis, R1-1717948, Prague, Czech Republic, Oct. 9-13, 2017, 4 pages.
3GPP TS 38.133 V0.3.0 (Nov. 2017), 3rd Generation Partnership Project, Technical Specification Group Radio Access Network, New Radio(NR), Requirements for support of radio resource management(Release 15), 24 pages.
Huawei et al., "Feature lead summary 1 of the remaining issues for RS multiplexing",3GPP Draft; R1-1803293, XP051398459, Feb. 27, 2018,14 pages.
3GPP TS 38.214 V1.0.0 (Sep. 2017), 3rd Generation Partnership Project,Technical Specification Group Radio Access Network, NR, Physical layer procedures for data (Release 15), 32 pages.
3GPP TS 38.213 V1.0.0 (Sep. 2017), 3rd Generation Partnership Project, Technical Specification Group Radio Access Network, NR, Physical layer procedures for control(Release 15), 16 pages.
3GPP TS 36.211 V13.0.0 (Dec. 2015), 3rd Generation Partnership Project;Technical Specification Group Radio Access Network, Evolved Universal Terrestrial Radio Access (E-UTRA), Physical channels and modulation(Release 13), 142 pages.
3GPP TS 36.212 V13.0.0 (Dec. 2015);3rd Generation Partnership Project, Technical Specification Group Radio Access Network, Evolved Universal Terrestrial Radio Access (E-UTRA), Multiplexing and channel coding(Release 13), 121 pages.
3GPP TS 36.213 V13.0.0 (Dec. 2015), 3rd Generation Partnership Project, Technical Specification Group Radio Access Network, Evolved Universal Terrestrial Radio Access (E-UTRA), Physical layer procedures(Release 13) 326 pages.
3GPP TS 36.331 V13.0.0 (Dec. 2015), 3rd Generation Partnership Project, Technical Specification Group Radio Access Network, Evolved Universal Terrestrial Radio Access (E-UTRA), Radio Resource Control (RRC), Protocol specification (Release 13), 507 pages.
Extended European Search Report issued in European Application No. 18879587.6 dated Apr. 28, 2020, 11 pages.
Office Action issued in Chinese Application No. 201910712732.6 dated Feb. 14, 2020,13 pages (With English Translation).
PCT International Search Report and Written Opinion in International Application No. PCT/CN2018/115,602, dated Feb. 11, 2019, 16 pages (With English Translation).
Office Action issued in Chinese Application No. 201910713360.9 dated Feb. 14, 2020, 12 pages (With English Translation).
Office Action issued in Chinese Application No. 201810480678.2 dated Feb. 16, 2022, 7 pages (with English translation).

\* cited by examiner

| Parameter name | Meaning | Typical value |
|---|---|---|
| ResourceConfig | Resource configuration | |
| ResourceConfigId | | |
| ResourceConfigType | Describing a time behavior, for example, aperiodic, semi-persistent, or periodic, and included in ResourceConfig | Aperiodic, semi-persistent, or periodic |
| ResourceSetConfigList | Resource set configuration list, included in ResourceConfig | |
| ResourceSetConfig | Resource set configuration, included in ResourceConfig | |
| ResourceSetConfigId | | |
| CSI-RS-ResourceConfigList | Resource configuration list, included in ResourceSetConfig | |
| NZP-CSI-RS-ResourceConfig | Non-zero power CSI-RS resource configuration | |
| NZP-CSI-RS-ResourceConfigId | | |
| CSI-RS-timeConfig | Period and offset | |
| NrofPorts | Port quantity | |
| CSI-RS-ResourceMapping | OFDM symbol and subcarrier of a CSI-RS | |
| CDMType | CDM value and pattern | |
| CSI-RS-Density | Density | |
| CSI-RS-FreqBand | Appearing frequency band | |
| Pc | Power-related parameter | |
| ScramblingID | Scrambling code | |
| ResourceRep | Used to indicate a beam sweeping type | ON/OFF |
| CSI-RS-SpatialRelationInfo | CSI-RS beam indication | |

FIG. 4

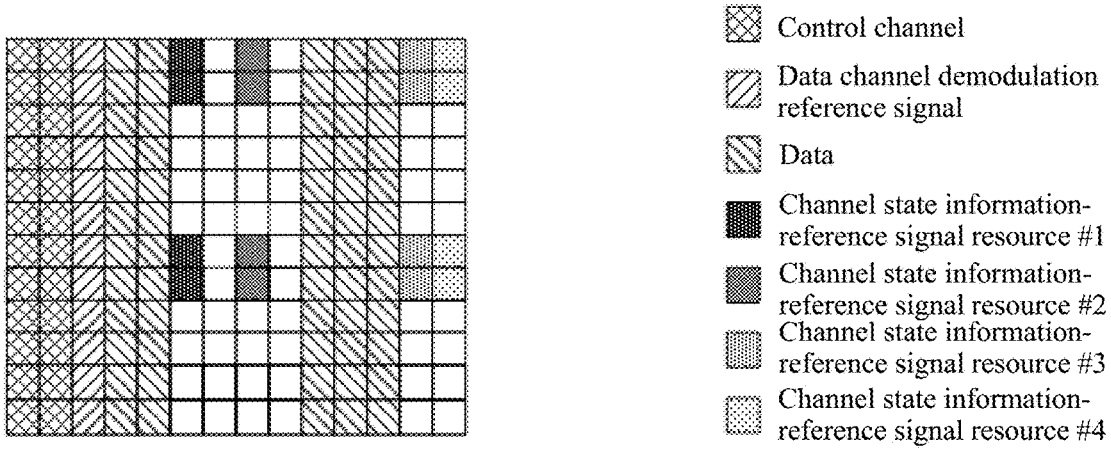

FIG. 5c

|  | A CSI-RS beam indication is the same as a PDSCH beam indication | A CSI-RS beam indication is different from a PDSCH beam indication |
|---|---|---|
| ResourceRep = ON | Mapping manner A | Mapping manner A |
| ResourceRep = OFF | Mapping manner B | Mapping manner A |

FIG. 6a

|  | A CSI-RS beam indication is the same as a PDSCH beam indication | A CSI-RS beam indication is different from a PDSCH beam indication | Without CSI-RS beam indication |
|---|---|---|---|
| ResourceRep ON | Mapping manner A | Mapping manner A | Mapping manner A |
| ResourceRep OFF | Mapping manner B | Mapping manner A | Mapping manner B |
| Without ResourceRep field | Mapping manner B | Mapping manner A | Mapping manner B |

FIG. 6b

COMMUNICATION METHOD AND COMMUNICATION APPARATUS

CROSS-REFERENCE TO RELATED APPLICATIONS

This application is a continuation of International Application No. PCT/CN2018/115602, filed on Nov. 15, 2018, which claims priority to Chinese Patent Application No. 201711147082.2 filed on Nov. 17, 2017 and Chinese Patent Application No. 201810480678.2 filed on May 18, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a new radio (NR) communications system, a beam is used for transmission. Beams of a transmit end and a receive end need to be aligned to ensure effective communication, and the beams of both the transmit end and the receive end may change during communication. Therefore, the beams of the transmit end and the receive end need to be aligned by sending a reference signal and performing measurement and feedback.

To improve utilization of a time-frequency resource, a network device may further map data onto an orthogonal frequency division multiplexing (OFDM) symbol onto which the reference signal is mapped. However, the reference signal may be sent by sweeping an analog beam, and data communication between the transmit end and the receive end is implemented by using an already aligned transmit/receive beam pair. Therefore, a beam direction during the data communication may be different from a beam direction during the transmission of the reference signal. Due to a capability limitation of the receive end, reception can be performed in only one beam direction in a time period of one OFDM symbol. If the data is also mapped onto the OFDM symbol onto which the reference signal is mapped, the data on the symbol may not be reliably received.

SUMMARY

This application provides a communication method and a communications apparatus, to reliably receive data.

According to a first aspect of this application, a communication method is provided, including: receiving, by a terminal device, reference signal configuration information sent by a network device, where the reference signal configuration information includes at least one of the following information: a beam sweeping type and a reference signal beam indication; receiving, by the terminal device, a reference signal and data that are sent by the network device; and determining, by the terminal device based on the reference signal configuration information, whether data can be mapped onto another resource element that is located on a same orthogonal frequency division multiplexing (OFDM) symbol as the reference signal.

In a possible implementation, the beam sweeping type includes sweeping a receive beam, sweeping a transmit beam, not sweeping a receive beam, and not sweeping a transmit beam; and the determining, by the terminal device based on the reference signal configuration information, whether data can be mapped onto another resource element that is located on a same OFDM symbol as the reference signal includes: if the beam sweeping type is sweeping a receive beam or not sweeping a transmit beam, determining, by the terminal device, that no data can be mapped onto the another resource element that is located on the same OFDM symbol as the reference signal; or if the beam sweeping type is sweeping a transmit beam or not sweeping a receive beam, determining, by the terminal device, that data can be mapped onto the another resource element that is located on the same OFDM symbol as the reference signal.

In another possible implementation, the reference signal configuration information includes a reference signal beam indication; and the determining, by the terminal device based on the reference signal configuration information, whether data can be mapped onto another resource element that is located on a same OFDM symbol as the reference signal includes: if the reference signal beam indication is different from a beam indication of the data, determining, by the terminal device, that no data can be mapped onto the another resource element that is located on the same OFDM symbol as the reference signal; or if the reference signal beam indication is the same as a beam indication of the data, determining, by the terminal device, that data can be mapped onto the another resource element that is located on the same OFDM symbol as the reference signal.

In still another possible implementation, the determining, by the terminal device based on the reference signal configuration information, whether data can be mapped onto another resource element that is located on a same OFDM symbol as the reference signal includes: if the beam sweeping type is sweeping a receive beam or not sweeping a transmit beam, determining, by the terminal device, that no data can be mapped onto the another resource element that is located on the same OFDM symbol as the reference signal; or if the beam sweeping type is sweeping a transmit beam or not sweeping a receive beam, and the reference signal beam indication is the same as a beam indication of the data, determining, by the terminal device, that data can be mapped onto the another resource element that is located on the same OFDM symbol as the reference signal; or if the beam sweeping type is sweeping a transmit beam or not sweeping a receive beam, and the reference signal beam indication is different from a beam indication of the data, determining, by the terminal device, that no data can be mapped onto the another resource element that is located on the same OFDM symbol as the reference signal.

According to a second aspect of this application, a communication method is provided, including: sending, by a network device, reference signal configuration information to a terminal device, where the reference signal configuration information includes at least one of the following information: a beam sweeping type and a reference signal beam indication, and the reference signal configuration information is used to indicate whether data can be mapped onto another resource element that is of the terminal device and that is located on a same orthogonal frequency division multiplexing (OFDM) symbol as a reference signal; sending, by the network device, the reference signal to the terminal device based on the reference signal configuration information; and sending, by the network device, data to the terminal device.

In a possible implementation, the beam sweeping type includes sweeping a receive beam, sweeping a transmit beam, not sweeping a receive beam, and not sweeping a transmit beam.

According to a third aspect of this application, a communication method is provided, including: receiving, by a terminal device, beam indication priority configuration information sent by a network device, where the beam indication priority configuration information includes priorities of at least two of the following beam indications: a data channel beam indication, a control channel beam indication, a synchronization signal block beam indication, and a reference signal beam indication; and determining, by the terminal device, a receive beam based on the beam indication priority configuration information.

According to a fourth aspect of this application, a communication method is provided, including: sending, by a network device, beam indication priority configuration information to a terminal device, where the beam indication priority configuration information includes priorities of at least two of the following beam indications: a data channel beam indication, a control channel beam indication, a synchronization signal block beam indication, and a reference signal beam indication; sending, by the network device, a reference signal to the terminal device; and sending, by the network device, data to the terminal device.

According to a fifth aspect of this application, another communication method is provided, including: receiving, by a terminal device, beam indication priority configuration information sent by a network device, where the beam indication priority configuration information includes priorities of at least two of the following beam indications: a data channel beam indication, a control channel beam indication, a random access channel beam indication, and a channel sounding signal beam indication; and determining, by the terminal device, a transmit beam based on the beam indication priority configuration information.

According to a sixth aspect of this application, still another communication method is provided, including: sending, by a network device, beam indication priority configuration information to a terminal device, where the beam indication priority configuration information includes priorities of at least two of the following beam indications: a data channel beam indication, a control channel beam indication, a random access channel beam indication, and a channel sounding signal beam indication.

With reference to the third aspect to the sixth aspect of this application, in a possible implementation, the reference signal includes at least one of the following types of reference signals: a periodic reference signal, a semi-persistent reference signal, and an aperiodic reference signal.

According to a seventh aspect of this application, a communication method is provided, including: reporting, by a terminal device, capability information to a network device, where the capability information is used to indicate that the terminal device has a multibeam reception capability; and receiving, by the terminal device by using a first beam, a reference signal sent by the network device, and receiving, by using a second beam, data sent by the network device.

According to an eighth aspect of this application, a communication method is provided, including: receiving, by a network device, capability information reported by a terminal device, where the capability information is used to indicate that the terminal device has a multibeam reception capability; sending, by the network device, a reference signal to the terminal device; and sending, by the network device, data to the terminal device.

According to a ninth aspect of this application, a communication method is provided, including: receiving, by a terminal device, downlink signal configuration information sent by a network device; receiving, by the terminal device, a downlink signal sent by the network device; and determining, by the terminal device based on the downlink signal configuration information, whether data can be mapped onto another resource element that is located on a same orthogonal frequency division multiplexing (OFDM) symbol as the downlink signal.

Correspondingly, a communication method is further provided, including: sending, by a network device, downlink signal configuration information to a terminal device; and sending, by the network device, a downlink signal to the terminal device based on the downlink signal configuration information.

According to a tenth aspect of this application, a communication method is provided, including: receiving, by a terminal device, downlink signal configuration information sent by a network device; receiving, by the terminal device, a downlink signal and data that are sent by the network device; and determining, by the terminal device based on the downlink signal configuration information, whether data can be mapped onto another resource element that is located on a same orthogonal frequency division multiplexing (OFDM) symbol as the downlink signal.

For example, the downlink signal is a synchronization signal block.

With reference to the ninth aspect to the tenth aspect, in an implementation, the synchronization signal block configuration information includes: the synchronization signal block is configured as a beam management resource and no beam quality needs to be reported, and/or the synchronization signal block is configured as a beam management resource and beam quality needs to be reported.

In another implementation, the determining, by the terminal device based on the synchronization signal block configuration information, whether data can be mapped onto another resource element that is located on a same OFDM symbol as the synchronization signal block includes: if the synchronization signal block is configured as the beam management resource and no beam quality needs to be reported, determining that no data can be mapped onto the another resource element that is located on the same OFDM symbol as the synchronization signal block; or if the synchronization signal block is configured as the beam management resource and the beam quality needs to be reported, determining that data can be mapped onto the another resource element that is located on the same OFDM symbol as the synchronization signal block.

In still another implementation, the method further includes: if the synchronization signal block is configured as the beam management resource and no beam quality needs to be reported, the terminal device does not need to assume that a same receive beam is used to receive a plurality of synchronization signal blocks or a plurality of symbols in a synchronization signal block; or if the synchronization signal block is configured as the beam management resource and the beam quality needs to be reported, the terminal device assumes that a same receive beam is used to receive a plurality of synchronization signal blocks or a plurality of symbols in a synchronization signal block.

In still another implementation, the synchronization signal block configuration information includes an index of a cell-defining synchronization signal block and/or an index of a non cell-defining synchronization signal block.

In still another implementation, the determining, by the terminal device based on the synchronization signal block configuration information, whether data can be mapped onto another resource element that is located on a same OFDM symbol as the synchronization signal block includes: if the synchronization signal block is a cell-defining synchronization signal block, determining that data can be mapped onto the another resource element that is located on the same OFDM symbol as the synchronization signal block; or if the synchronization signal block is a non cell-defining synchronization signal block, determining that no data can be mapped onto the another resource element that is located on the same OFDM symbol as the synchronization signal block.

In still another implementation, the method further includes: if the synchronization signal block is a cell-defining synchronization signal block, the terminal device assumes that a same receive beam is used to receive a plurality of synchronization signal blocks or a plurality of symbols in a synchronization signal block; or if the synchronization signal block is a non cell-defining synchronization signal block, the terminal device does not need to assume that a same receive beam is used to receive a plurality of synchronization signal blocks or a plurality of symbols in a synchronization signal block.

According to an eleventh aspect of this application, a communication method is provided, including: receiving, by a terminal device, synchronization signal block configuration information sent by a network device; and receiving, by the terminal device, a synchronization signal block sent by the network device, where if the synchronization signal block is configured as a beam management resource and no beam quality needs to be reported, the terminal device does not need to assume that a same receive beam is used to receive a plurality of synchronization signal blocks or a plurality of symbols in a synchronization signal block; or if the synchronization signal block is configured as a beam management resource and beam quality needs to be reported, the terminal device assumes that a same receive beam is used to receive a plurality of synchronization signal blocks or a plurality of symbols in a synchronization signal block.

According to a twelfth aspect of this application, a communication method is provided, including: receiving, by a terminal device, synchronization signal block configuration information sent by a network device; and receiving, by the terminal device, a synchronization signal block sent by the network device, where if the synchronization signal block is a cell-defining synchronization signal block, the terminal device assumes that a same receive beam is used to receive a plurality of synchronization signal blocks or a plurality of symbols in a synchronization signal block; or if the synchronization signal block is a non cell-defining synchronization signal block, the terminal device does not need to assume that a same receive beam is used to receive a plurality of synchronization signal blocks or a plurality of symbols in a synchronization signal block.

According to a thirteenth aspect of this application, a communications apparatus is provided, and can implement the foregoing communication methods. For example, the communications apparatus may be a chip (for example, a baseband chip or a communications chip) or a device (for example, a terminal device). The foregoing methods may be implemented by software or hardware, or by hardware executing corresponding software.

In a possible implementation, a structure of the communications apparatus includes a processor and a memory. The processor is configured to support the communications apparatus in performing a corresponding function in the foregoing communication methods. The memory is configured to be coupled to the processor, and stores a program (an instruction) and/or data that are/is necessary for the communications apparatus. Optionally, the communications apparatus may further include a communications interface, configured to support communication between the communications apparatus and another network element.

In another possible implementation, the communications apparatus may include a receiving unit and a processing unit. The receiving unit and the processing unit are respectively configured to implement receiving and processing functions in the foregoing methods. For example, the receiving unit is configured to: receive reference signal configuration information sent by a network device, and receive a reference signal and data that are sent by the network device; and the processing unit is configured to determine, based on the reference signal configuration information, whether data can be mapped onto another resource element that is located on a same orthogonal frequency division multiplexing (OFDM) symbol as the reference signal. For another example, the receiving unit is configured to receive beam indication priority configuration information sent by a network device; and the processing unit is configured to determine a receive beam based on the beam indication priority configuration information. For another example, the receiving unit is configured to receive beam indication priority configuration information sent by a network device; and the processing unit is configured to determine a transmit beam based on the beam indication priority configuration information. For another example, the communications apparatus further includes a sending unit. The sending unit is configured to implement a sending function in the foregoing methods. The sending unit is configured to report capability information to a network device; and the receiving unit is configured to: receive, by using a first beam, a reference signal sent by the network device, and receive, by using a second beam, data sent by the network device. The communications apparatus may further include a processing unit. For example, the receiving unit is configured to receive synchronization signal block configuration information sent by a network device, and the receiving unit is further configured to receive a synchronization signal block sent by the network device; and the processing unit is configured to determine, based on the synchronization signal block configuration information, whether data can be mapped onto another resource element that is located on a same orthogonal frequency division multiplexing (OFDM) symbol as the synchronization signal block.

When the communications apparatus is a chip, the receiving unit may be an input unit, for example, an input circuit or a communications interface; and the sending unit may be an output unit, for example, an output circuit or a communications interface. When the communications apparatus is a device, the receiving unit may be a receiver; and the sending unit may be a transmitter.

According to a fourteenth aspect of this application, a communications apparatus is provided, and can implement the foregoing communication methods. For example, the communications apparatus may be a chip (for example, a baseband chip or a communications chip) or a device (for example, a network device or a baseband processing board).

The foregoing methods may be implemented by software or hardware, or by hardware executing corresponding software.

In a possible implementation, a structure of the communications apparatus includes a processor and a memory. The processor is configured to support the communications apparatus in performing a corresponding function in the foregoing communication methods. The memory is configured to be coupled to the processor, and stores a program (an instruction) and data that are necessary for the communications apparatus. Optionally, the communications apparatus may further include a communications interface, configured to support communication between the communications apparatus and another network element.

In another possible implementation, the communications apparatus may include a sending unit. The sending unit is configured to implement a sending function in the foregoing methods. For example, the sending unit is configured to send reference signal configuration information to a terminal device, and is further configured to send a reference signal and data to the terminal device based on the reference signal configuration information. For another example, the sending unit is configured to send beam indication priority configuration information to a terminal device; and is further configured to send a reference signal and data to the terminal device based on the beam indication priority configuration information. For another example, the sending unit is configured to send beam indication priority configuration information to a terminal device. The communications apparatus may further include a receiving unit. The receiving unit is configured to implement a receiving function in the foregoing methods. For example, the receiving unit is configured to receive capability information reported by a terminal device; and the sending unit is configured to send a reference signal and data to the terminal device. For another example, the sending unit is configured to send synchronization signal block configuration information to a terminal device; and send a synchronization signal block to the terminal device based on the synchronization signal block configuration information.

When the communications apparatus is a chip, the receiving unit may be an input unit, for example, an input circuit or a communications interface; and the sending unit may be an output unit, for example, an output circuit or a communications interface. When the communications apparatus is a device, the receiving unit may be a receiver (or may be referred to as a receiver); and the sending unit may be a transmitter (or may be referred to as a transmitter).

According to a fifteenth aspect of this application, a computer readable storage medium is provided, where the computer readable storage medium stores an instruction, and when the instruction runs on a computer, the computer is enabled to perform the method according to any one of the foregoing aspects.

According to a sixteenth aspect of this application, a computer program product including an instruction is provided, where when the computer program product runs on a computer, the computer is enabled to perform the method according to any one of the foregoing aspects.

BRIEF DESCRIPTION OF DRAWINGS

To describe the technical solutions in the embodiments of this application or in the background more clearly, the following briefly describes the accompanying drawings required for describing the embodiments of this application or the background.

FIG. 4 is a schematic diagram of a CSI-RS resource configuration parameter table;

FIG. 5a to FIG. 5c each are a schematic diagram of a mapping of time-frequency resources of a reference signal and data;

FIG. 6a and FIG. 6b each are a schematic diagram of a data mapping manner;

DESCRIPTION OF EMBODIMENTS

The following describes the embodiments of this application with reference to the accompanying drawings in the embodiments of this application.

Figure 1:
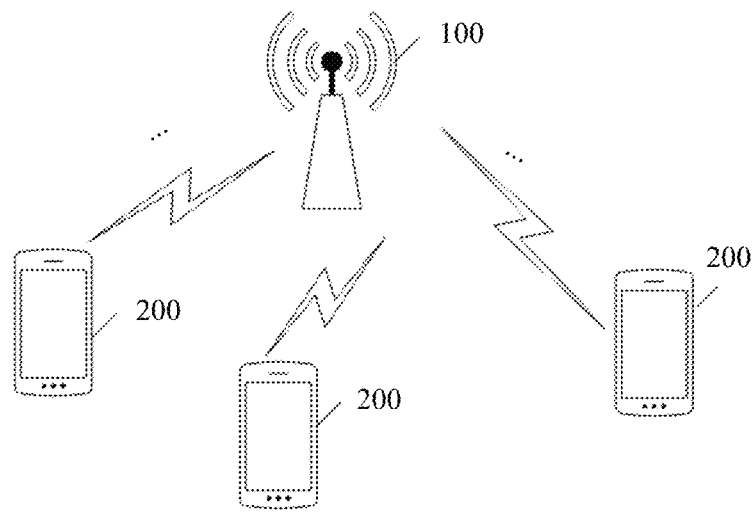
FIG. 1 is a schematic diagram of a communications system according to an embodiment of this application.

FIG. 1 is a schematic diagram of a communications system. The communications system may include at least one network device 100 (only one is shown) and one or more terminal devices 200 connected to the network device 100.

The network device 100 may be a device that can communicate with the terminal device 200. The network device 100 may be any device having a wireless transceiver function, including but not limited to a base station (for example, a NodeB, an evolved NodeB eNodeB, a base station in a fifth generation (5G) communications system, a base station or a network device in a future communications system, an access point in a Wi-Fi system, a wireless relay node, or a wireless backhaul node) and the like. The network device 100 may be alternatively a radio controller in a cloud radio access network (CRAN) scenario. The network device 100 may be alternatively a network device in a 5G network or a network device in a future evolved network; or may be a wearable device, a vehicle-mounted device, or the like. The network device 100 may be alternatively a small cell, a transmission reference point (TRP), or the like. Certainly, this application is not limited thereto.

The terminal device 200 is a device having a wireless transceiver function, and may be deployed on land, including indoors or outdoors, or in a handheld, worn, or vehicle-mounted manner; or may be deployed on the water (such as a ship); or may be deployed in the air (for example, on an airplane, a balloon, and a satellite). The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. Sometimes, the terminal device may also be referred to as user equipment (UE), an access terminal device, a UE unit, a UE station, a mobile station, a mobile console, a remote station, a remote terminal device, a mobile device, a UE terminal device, a terminal device, a terminal, a wireless communications device, a UE agent, a UE apparatus, or the like.

It should be noted that, terms "system" and "network" in this embodiment of this application may be used interchangeably. "A plurality of" means two or more. In view of this, "a plurality of" in this embodiment of this application may also be understood as "at least two". "And/or" describes an association relationship for describing associated objects and represents that three relationships may exist. For example, A and/or B may represent the following three cases: Only A exists, both A and B exist, and only B exists. In addition, unless otherwise stated, the character "/" usually indicates an "or" relationship between the associated objects.

This application provides a communication method and a communications apparatus, where reference signal configuration information is sent to indicate whether data is mapped onto another resource element that is located on a same orthogonal frequency division multiplexing symbol as a reference signal, to determine whether data is to be received on the symbol, so that reliable data reception can be implemented.

Figure 2:
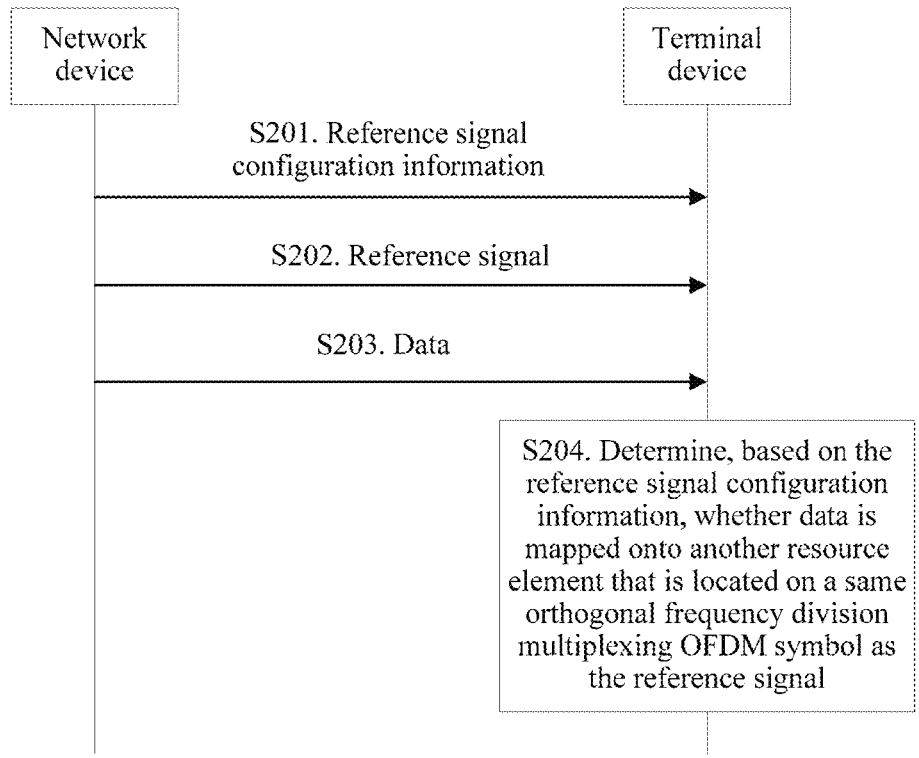
FIG. 2 is a schematic interaction flowchart of a communication method according to an embodiment of this application.

FIG. 2 is a schematic interaction flowchart of a communication method according to an embodiment of this application. The method may include the following steps.

S201. A network device sends reference signal configuration information to a terminal device, where the reference signal configuration information includes at least one of the following information: a beam sweeping type and a reference signal beam indication, and the reference signal configuration information is used to indicate whether data is mapped onto another resource element that is located on a same orthogonal frequency division multiplexing symbol as a reference signal. The terminal device receives the reference signal configuration information sent by the network device.

S202. The network device sends the reference signal to the terminal device based on the reference signal configuration information. The terminal device receives the reference signal sent by the network device.

S203. The network device sends data to the terminal device. The terminal device receives the data sent by the network device.

S204. The terminal device determines, based on the reference signal configuration information, whether data is mapped onto another resource element that is located on a same orthogonal frequency division multiplexing (OFDM) symbol as the reference signal.

A beam management process is a process of beam alignment between a transmit end and a receive end. This is mainly implemented through reference signal sending, measurement, and feedback. Specifically, the process includes: The transmit end sends a reference signal by using a plurality of different analog beams, and selects an appropriate transmit beam based on feedback from the receive end. The receive end measures the reference signal by using a plurality of different analog beams, and selects an appropriate receive beam based on receiving quality.

The network device regularly or irregularly sends a reference signal to the terminal device, to obtain beam quality of the terminal device and perform beam management. The network device further sends the data to the terminal device. In this embodiment, the reference signal is a channel state information-reference signal (CSI-RS), a cell-specific reference signal (CS-RS), a UE-specific reference signal (user equipment specific reference signal, US-RS), a sounding reference signal (SRS), or the like.

In this embodiment, to improve time-frequency resource utilization, the network device may also map data onto an OFDM symbol onto which the reference signal is mapped. In addition, in this embodiment, before sending the reference signal and the data, the network device sends the reference signal configuration information to the terminal device. The reference signal configuration information is used to indicate whether data is mapped onto the another resource element that is located on the same orthogonal frequency division multiplexing symbol as the reference signal. The reference signal configuration information may include only a beam sweeping type, or include only a reference signal beam indication, or the reference signal configuration information may include a beam sweeping type and a reference signal beam indication. Specific descriptions are separately provided below:

In an implementation, the reference signal configuration information includes a beam sweeping type. The beam sweeping type includes sweeping a receive beam, sweeping a transmit beam, not sweeping a receive beam, and not sweeping a transmit beam. In this case, step S204 is specifically:

if the beam sweeping type is sweeping a receive beam or not sweeping a transmit beam, determining, by the terminal device, that no data is mapped onto the another resource element that is located on the same OFDM symbol as the reference signal; or if the beam sweeping type is sweeping a transmit beam or not sweeping a receive beam, determining, by the terminal device, that data is mapped onto the another resource element that is located on the same OFDM symbol as the reference signal.

Figure 3A:
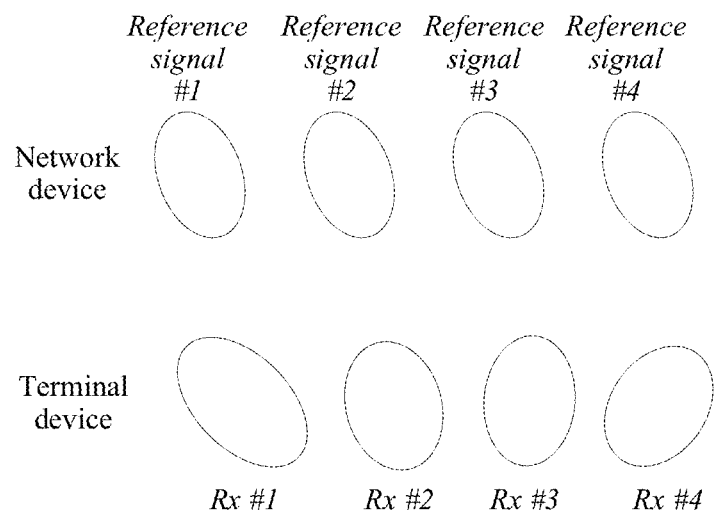
FIG. 3a and FIG. 3b each are a schematic diagram of beam sweeping.

As shown in a schematic diagram of beam sweeping in FIG. 3a, the beam sweeping type is sweeping a receive beam or not sweeping a transmit beam. That is, beam directions of all reference signals in a reference signal set are the same. The reference signal set is used by the terminal device for a receive beam training service. The terminal device receives each reference signal in the reference signal set by using different receive beams, and selects an appropriate receive beam.

Figure 3B:
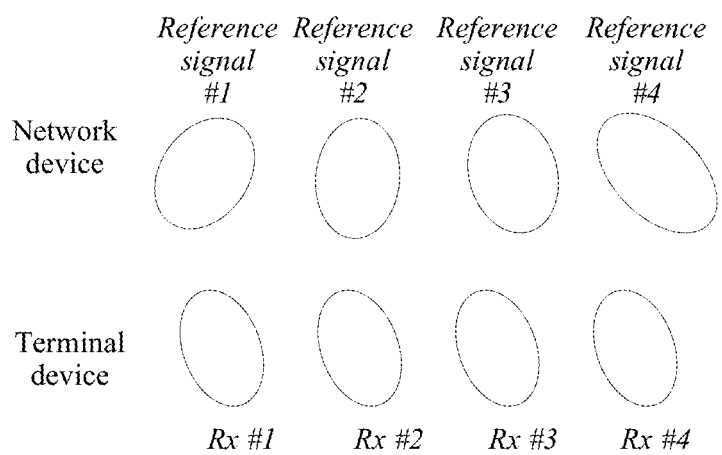

As shown in a schematic diagram of beam sweeping in FIG. 3b, the beam sweeping type is sweeping a transmit beam or not sweeping a receive beam. To be specific, the terminal device cannot assume that beam directions of all reference signals in a reference signal set are the same. The reference signal set is used by the network device for transmit beam training. The terminal device receives each reference signal in the reference signal set by using a same receive beam, and selects an appropriate transmit beam of the network device.

The reference signal configuration information used to indicate the beam sweeping type may be a specific field. A CSI-RS is used as an example, and a CSI-RS resource configuration parameter table is shown in FIG. 4. CSI-RS resource configuration may be related to a parameter in FIG. 4, but may not be limited thereto. A ResourceRep field is used to indicate a beam sweeping type. A value of the field is ON or OFF. If the value of the field is ON, it indicates that the beam sweeping type is sweeping a receive beam or not sweeping a transmit beam. If the value of the field is OFF, it indicates that the beam sweeping type is sweeping a transmit beam or not sweeping a receive beam.

As described in a standard proposal:

It was agreed in previous meetings that NR supports higher layer configuration of a set of single-symbol CSI-RS resources where the set configuration contains an information element (IE) indicating whether repetition is "ON/OFF". The gNB Tx beam is assumed fixed if set as "ON", which is suitable to indicate UE that this set of CSI-RS resources is used for P3 procedure, where gNB fixes its Tx beam and UE sweeps its Rx beam to select the best one. It is reasonable that, on the symbol configured with CSI-RS resource, UE shall not assume data transmission, at least for the UE which doesn't support simultaneous multi-beam reception, as shown in the next figure. On the other hand, if this IE is "OFF" for a set of single-symbol CSI-RS resources, it is suitable to indicate UE that this set of CSI-RS resources is used for P2 procedure, where gNB sweeps its Tx beams and UE fixes it Rx beams to select the best Tx beam to report. In this case, UE Rx beam stays the same to receive both PDSCH and CSI-RS, and the rate matching can be only around CSI-RS REs.

Proposal: Support UE to Assume No Data Transmission on the OFDM Symbols Contains CSI-RS Resources if the Resource Repetition IE is Configured as "ON".

The NR supports a higher layer configuration of a single-symbol CSI-RS resource set, where a configuration of the resource set includes an information element (IE), used to indicate that the value of the ResourceRep field is ON/OFF. If a value of the IE is ON, the receive beam of the network device is assumed to be fixed. This is used to indicate, to the terminal device, that the CSI-RS resource set is used for a P3 procedure, where the network device fixes the receive beam of the network device, and the terminal device sweeps receive beams of the terminal device to select the best receive beam. On a symbol on which a CSI-RS resource is configured, the terminal device does not receive data, and this is proper at least for terminal devices that do not support multibeam reception. In addition, for the single-symbol CSI-RS resource set, if the value of the IE is OFF, it is used to indicate, to the terminal device, that the CSI-RS resource set is used for a P2 procedure, where the network device sweeps receive beams of the network device, and the terminal device needs to fix a receive beam of the terminal device, and select and report the best receive beam. In this case, the receive beam of the terminal device may remain unchanged, a PDSCH and a CSI-RS are received by using a same receive beam, and only a resource element for the CSI-RS needs to be considered for rate matching. Therefore, if the IE is configured to ON, the terminal device needs to assume that there is no data transmission on the OFDM symbol including the CSI-RS resource.

Figure 5A:
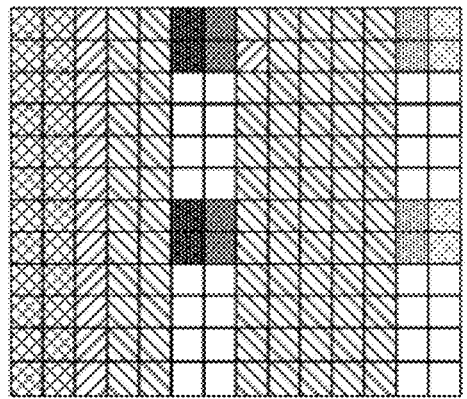

Specifically, FIG. 5a is a schematic diagram of a mapping of time-frequency resources of a reference signal and data, if the beam sweeping type is sweeping a receive beam or not sweeping a transmit beam, or the value of the ResourceRep field is ON. Considering that the terminal device needs to measure the CSI-RS by using different receive beams, and considering that the terminal device does not have a capability of performing reception by simultaneously using a plurality of analog receive beams, the network device should not map data onto the OFDM symbol onto which the CSI-RS is mapped; otherwise, the terminal device cannot receive data that is mapped onto the OFDM symbol onto which the CSI-RS is mapped, affecting decoding of the terminal device. As shown in FIG. 5a, on OFDM symbols {6, 7, 13, 14}, a resource element (RE) other than an RE onto which the CSI-RS is mapped is empty with no data mapped. For the OFDM symbols {6, 7, 13, 14}, the receive beam of the terminal device is a sweeping beam used for CSI-RS measurement. For OFDM symbols {4, 5, 8 to 12}, the receive beam of the terminal device is a beam corresponding to a physical downlink shared channel (PDSCH) beam indication, that is, data is received by using a beam corresponding to a data channel beam indication.

Figure 5B:
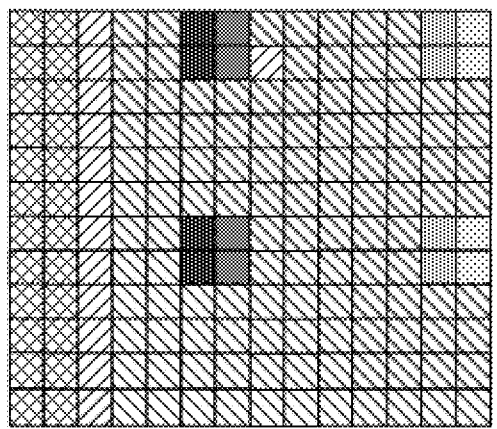

FIG. 5b is a schematic diagram of another mapping of time-frequency resources of a reference signal and data, if the beam sweeping type is sweeping a transmit beam or not sweeping a receive beam, or the value of the ResourceRep field is OFF. Considering that the receive beam used by the terminal device does not change, the network device may map data onto the OFDM symbol onto which the CSI-RS is mapped (except the RE onto which the CSI-RS is mapped). For OFDM symbols {4 to 14}, the receive beam of the terminal device is a beam corresponding to a PDSCH beam indication, that is, data and a reference signal are received by using a beam corresponding to a data channel beam indication.

In addition, considering a switching capability of the terminal device, if the switching capability of the terminal device is relatively weak, a relatively long time is needed for receive beam switching (for example, a symbol time is needed for switching). In this case, a mapping manner B may be as follows: FIG. 5c is a schematic diagram of still another mapping of time-frequency resources of a reference signal and data, where no data can be mapped onto the symbol onto which the CSI-RS is mapped and a subsequent symbol. A switching time of the terminal device may be reported as a UE capability, for example, may be reported by using layer-3 signaling such as RRC signaling. The network device may perform puncturing or rate matching based on the capability.

In conclusion, the terminal device determines a data mapping method based on the beam sweeping type, and in particular, determines whether data is mapped onto the OFDM symbol onto which the reference signal is mapped. Specifically, the beam sweeping type is indicated to the terminal device by defining the ResourceRep field. This can ensure that the terminal device does not miss receiving data, and implement efficient use of time-frequency resources.

It should be noted that, in the foregoing description, the CSI-RS is used for beam sweeping and association, and if beams are aligned, the CSI-RS is used to obtain channel information. In addition, when the beams are aligned, resource configuration information of the CSI-RS may not include the ResourceRep field. To be specific, information indicating whether ResourceRep is ON/OFF may not be included. In this scenario, the network device and the terminal device need to assume that a time-frequency resource mapping manner shown in FIG. 5b is used, that is, assume that data is mapped onto the OFDM symbol onto which the CSI-RS is mapped, and the terminal device receives the CSI-RS and the data by using a receive beam corresponding to a data channel beam indication.

In another implementation, the reference signal configuration information includes a reference signal beam indication. In this case, step S204 is specifically:

if the reference signal beam indication is different from a beam indication of the data, determining, by the terminal device, that no data is mapped onto the another resource element that is located on the same OFDM symbol as the reference signal; or if the reference signal beam indication is the same as a beam indication of the data, determining, by the terminal device, that data is mapped onto the another resource element that is located on the same OFDM symbol as the reference signal.

Specifically, if the reference signal beam indication is different from the beam indication of the data (namely, a PDSCH beam indication), the terminal device is required to measure the reference signal and receive the data by using different receive beams. In addition, considering that the terminal device does not have a capability of performing reception by simultaneously using a plurality of analog receive beams, the network device should not map data onto the OFDM symbol onto which the reference signal is mapped; otherwise, the terminal device cannot receive data that is mapped onto the OFDM symbol onto which the CSI-RS is mapped, affecting decoding of the terminal device. As shown in FIG. 5a, on OFDM symbols {6, 7, 13, 14}, an RE other than an RE onto which the CSI-RS is mapped is empty with no data mapped. For the OFDM symbols {6, 7, 13, 14}, the receive beam of the terminal device is a sweeping beam used for CSI-RS measurement. For OFDM symbols {4, 5, 8 to 12}, the receive beam of the terminal device is a beam corresponding to the PDSCH beam indication, that is, data is received by using a beam corresponding to a data channel beam indication.

If the reference signal beam indication is the same as the beam indication of the data, the terminal device is required to measure the reference signal and receive the data by using a same receive beam. In this case, the network device may map data onto the OFDM symbol onto which the CSI-RS is mapped (except the RE onto which the CSI-RS is mapped), as shown in FIG. 5b. For OFDM symbols {4 to 14}, the receive beam of the terminal device is a beam corresponding to the PDSCH beam indication, that is, the data and the reference signal are received by using a beam corresponding to the reference signal beam indication or the beam indication of the data.

The beam indication includes at least one of the following indications: a beam number, a downlink signal resource number, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, or an index of a transmit codebook corresponding to a beam. The downlink signal includes any one of a CSI-RS, a CS-RS, or a US-RS. Optionally, the network device may further assign a QCL identifier to beams having a quasi-co-location (QCL) relationship in beams associated with a frequency resource group.

Specifically, the reference signal beam indication may be a specific field. A resource configuration of the CSI-RS is used as an example. As shown in FIG. 4, a CSI-RS-SpatialRelationlnfo field is a beam indication field of the receive beam of the reference signal. Comparing whether the reference signal beam indication is the same as the beam indication of the data is comparing whether a value of the CSI-RS-SpatialRelationlnfo field is the same as the beam indication of the data.

It should be noted that, the reference signal beam indication may mean that a reference signal set includes such a beam indication. In this case, all reference signals in the reference signal set correspond to a same reference signal beam indication. The reference signal beam indication may be alternatively a reference signal beam indication corresponding to each reference signal.

In conclusion, the network device defines time-frequency resource mapping when the reference signal beam indication is the same as or different from the beam indication of the data, and the terminal device compares whether the reference signal beam indication is the same as the beam indication of the data, to determine whether data is mapped onto the OFDM symbol onto which the CSI-RS is mapped. This ensures that the terminal device does not miss receiving the data, and implements efficient use of time-frequency resources.

In still another implementation, the reference signal configuration information includes a beam sweeping type and a reference signal beam indication. As shown in FIG. 6a, that no data is mapped onto an OFDM symbol onto which a CSI-RS is mapped is referred to as a "mapping manner A", and that data is mapped onto an OFDM symbol onto which a CSI-RS is mapped is referred to as a "mapping manner B". The mapping manner A may be referred to as rate matching at a symbol level. The mapping manner B may be referred to as rate matching at an RE level. The mapping manner A or the mapping manner B may be alternatively explicitly configured by the network device through signaling. The terminal device determines a mapping manner for data transmission based on the configuration.

In this case, step S204 is specifically:

if the beam sweeping type is sweeping a receive beam or not sweeping a transmit beam, determining, by the terminal device, that no data is mapped onto the another resource element that is located on the same OFDM symbol as the reference signal; or if the beam sweeping type is sweeping a transmit beam or not sweeping a receive beam, and the reference signal beam indication is the same as a beam indication of the data, determining, by the terminal device, that data is mapped onto the another resource element that is located on the same OFDM symbol as the reference signal; or if the beam sweeping type is sweeping a transmit beam or not sweeping a receive beam, and the reference signal beam indication is different from a beam indication of the data, determining, by the terminal device, that no data is mapped onto the another resource element that is located on the same OFDM symbol as the reference signal.

The CSI-RS is used as an example. This implementation is specifically determining, based on both a ResourceRep field and a CSI-RS-SpatialRelationlnfo field in a CSI-RS configuration, whether data is mapped onto the OFDM symbol onto which the CSI-RS is mapped. Specifically, when the beam sweeping type is sweeping a receive beam or not sweeping a transmit beam, or a value of the ResourceRep field is ON, whether the reference signal beam indication is the same as the beam indication of the data is not considered herein because the reference signal set is used by the terminal device for a receive beam training service. The terminal device needs to use different receive beams to receive each CSI-RS in the CSI-RS set. In addition, considering that the terminal device does not have a capability of performing reception by simultaneously using a plurality of analog receive beams, no data can be mapped onto any OFDM symbol onto which the CSI-RS is mapped. On OFDM symbols {6, 7, 13, 14}, an RE other than an RE onto which the CSI-RS is mapped is empty with no data mapped. For the OFDM symbols {6, 7, 13, 14}, the receive beam of the terminal device is a sweeping beam used for CSI-RS measurement. For OFDM symbols {4, 5, 8 to 12}, the receive beam of the terminal device is a beam corresponding to a PDSCH beam indication, that is, data is received by using a beam corresponding to a data channel beam indication.

When the beam sweeping type is sweeping a transmit beam or not sweeping a receive beam (for example, the value of the ResourceRep field is OFF), and the reference signal beam indication is the same as the beam indication of the data, the receive beam used by the terminal device does not change, and the reference signal beam indication is the same as the beam indication of the data. In this case, data may be mapped onto the OFDM symbol onto which the CSI-RS is mapped. For OFDM symbols {4 to 14}, the receive beam of the terminal device is a beam corresponding to a PDSCH beam indication, that is, data and a reference signal are received by using a beam corresponding to a data channel beam indication.

When the beam sweeping type is sweeping a transmit beam or not sweeping a receive beam (for example, the value of the ResourceRep field is OFF), and the reference signal beam indication is different from the beam indication of the data, the receive beam used by the terminal device does not change, but the reference signal beam indication is different from the beam indication of the data. Considering that the terminal device does not have the capability of performing reception by simultaneously using a plurality of analog receive beams, in this case, no data can be mapped onto the OFDM symbol onto which the CSI-RS is mapped. As shown in FIG. 5b, on the OFDM symbols {6, 7, 13, 14}, an RE other than an RE onto which the CSI-RS is mapped is empty with no data mapped. For the OFDM symbols {6, 7, 13, 14}, the receive beam of the terminal device is a sweeping beam used for CSI-RS measurement. For the OFDM symbols {4, 5, 8 to 12}, the receive beam of the terminal device is a beam corresponding to a PDSCH beam indication, that is, data is received by using a beam corresponding to a data channel beam indication.

In addition, considering that neither the ResourceRep field nor the CSI-RS-SpatialRelationInfo field may appear, a possible data mapping manner may be shown in FIG. 6b. If there is no ResourceRep field, and a CSI-RS beam indication is the same as the beam indication of the data, data may be mapped onto the OFDM symbol onto which the CSI-RS is mapped, in other words, the mapping manner B is used. If there is no ResourceRep field, and a CSI-RS beam indication is different from the beam indication of the data, no data is mapped onto the OFDM symbol onto which the CSI-RS is mapped, in other words, the mapping manner A is used. If the value of the ResourceRep field is ON, and there is no CSI-RS-SpatialRelationInfo field, the mapping manner A is used. If the value of the ResourceRep field is OFF, and there is no CSI-RS-SpatialRelationInfo field, the mapping manner B is used. If there is no ResourceRep field and no CSI-RS-SpatialRelationInfo field, the mapping manner B is used.

In another embodiment, if there is a ResourceRep field, in other words, there is a beam sweeping behavior, the mapping manner A should be used. That is, no data is mapped during beam sweeping.

In this embodiment, data or no data is mapped onto the another resource element on the same OFDM symbol. The data herein may be a part of transmitted data. Data may be further mapped onto another OFDM symbol. In addition, if the network device punctures the data or performs rate matching, the terminal device needs to assume that the data is punctured by a CSI-RS RE or assume that rate matching is performed around the CSI-RS RE. In addition, that the network device sends the reference signal in step S202 and that the network device sends data in step S203 may be performed simultaneously.

According to the communication method provided in this embodiment of this application, the reference signal configuration information is sent to indicate whether data is mapped onto the another resource element that is located on the same orthogonal frequency division multiplexing symbol as the reference signal, to determine whether data is to be received on the symbol, so that reliable data reception can be implemented.

Figure 7:
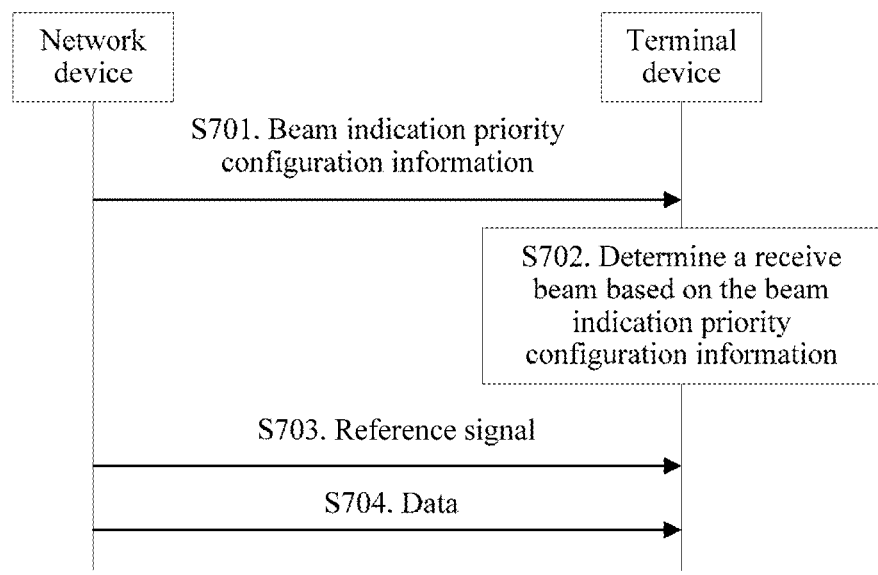
FIG. 7 is a schematic interaction flowchart of another communication method according to an embodiment of this application.

FIG. 7 is a schematic interaction flowchart of another communication method according to an embodiment of this application. The method may include the following steps.

S701. A network device sends beam indication priority configuration information to a terminal device, where the beam indication priority configuration information includes priorities of at least two of the following beam indications: a data channel beam indication, a control channel beam indication, a synchronization signal block beam indication, and a reference signal beam indication. The terminal device receives the beam indication priority configuration information.

S702. The terminal device determines a receive beam based on the beam indication priority configuration information.

S703. The network device sends a reference signal to the terminal device.

S704. The network device sends data to the terminal device.

The terminal device receives the data or measures the reference signal by using the determined receive beam.

In downlink communication, if a plurality of beam indications of the terminal device take effect at the same time, the terminal device needs to determine the receive beam of the terminal device based on a predefined or preconfigured priority. The same time may be within one OFDM symbol time. The plurality of beam indications include at least two of the data channel beam indication, the control channel beam indication, the synchronization signal block beam indication, and the reference signal beam indication. In this embodiment, the network device sends the beam indication priority configuration information to the terminal device. The beam indication priority configuration information includes the priorities of the at least two of the following beam indications: the data channel beam indication, the control channel beam indication, the synchronization signal block beam indication, and the reference signal beam indication.

The reference signal includes at least one of the following types of reference signals: a periodic reference signal, a semi-persistent reference signal, and an aperiodic reference signal.

In addition, that a beam indication, such as the data channel beam indication, takes effect means that the terminal device needs to receive a data channel within the OFDM symbol time by using a receive beam corresponding to the data channel beam indication. That another beam indication takes effect is similar to that the data channel beam indication takes effect.

After receiving the beam indication priority configuration information sent by the network device, the terminal device needs to perform reception preferentially by using a receive beam corresponding to a beam indication with a higher priority. Descriptions are provided below by using specific examples.

In an example, priorities of a PDSCH and a CSI-RS are as follows:
PDSCH>periodic CSI-RS
PDSCH>semi-persistent CSI-RS
aperiodic CSI-RS>PDSCH When a PDSCH beam indication collides with a CSI-RS beam indication, the terminal device determines, based on a beam indication priority configuration, whether to abandon reception of the CSI-RS or data.

PDSCH>periodic CSI-RS: receiving the data by using a receive beam corresponding to the PDSCH beam indication, and abandoning CSI-RS measurement in a slot.

PDSCH>semi-persistent CSI-RS: receiving the data by using a receive beam corresponding to the PDSCH beam indication, and abandoning CSI-RS measurement in the slot.

Aperiodic CSI-RS>PDSCH: measuring the CSI-RS by using a receive beam corresponding to the CSI-RS beam indication, abandoning reception of data on an OFDM symbol onto which the CSI-RS is mapped, and requesting retransmission.

In another example, for example, for a PDCCH beam indication and a PDSCH beam indication:

a priority of the PDCCH beam indication>a priority of the PDSCH beam indication. Such a configuration is applicable to a terminal device with high mobility. Considering that a PDCCH beam usually features better robustness, when the PDSCH beam indication collides with the PDCCH beam indication, it is preferentially considered that the PDCCH beam is used to receive data, so that coverage can be better ensured.

A priority of the PDSCH beam indication>a priority of the PDCCH beam indication. Such a configuration is applicable to a stable terminal device. Considering that a PDSCH beam usually features a higher antenna gain, when the PDSCH beam indication collides with the PDCCH beam indication, reception using the PDSCH beam can obtain better received energy.

According to the communication method provided in this embodiment of this application, priorities of beam indications of a plurality of receive beams are specified. In the downlink communication, if the beam indications of the receive beams collide, the receive beam can be determined based on the priorities of the beam indications, thereby ensuring reliable data reception.

Correspondingly, a beam indication with a low priority becomes invalid.

A collision between beam indications mainly means that beam indications of a plurality of frequency division multiplexing channels/signals are different.

Figure 8:
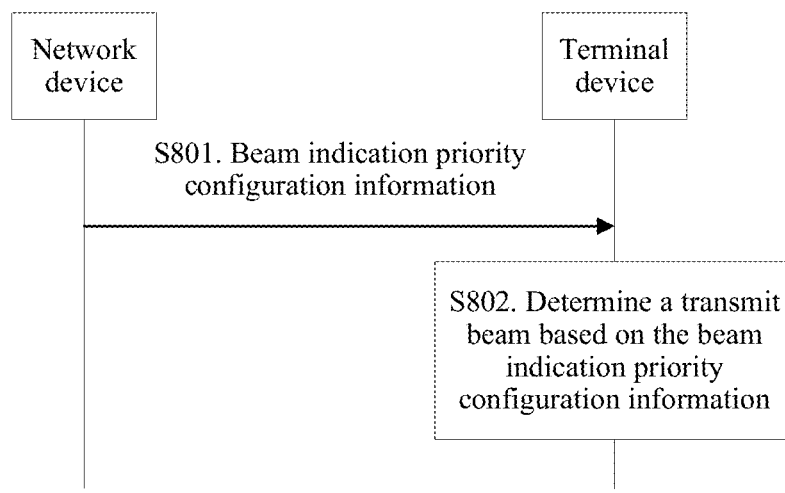
FIG. 8 is a schematic interaction flowchart of still another communication method according to an embodiment of this application.

FIG. 8 is a schematic interaction flowchart of still another communication method according to an embodiment of this application. The method may include the following steps.

S801. A network device sends beam indication priority configuration information to a terminal device, where the beam indication priority configuration information includes priorities of at least two of the following beam indications: a data channel beam indication, a control channel beam indication, a random access channel beam indication, and a channel sounding signal beam indication. The terminal device receives the beam indication priority configuration information.

S802. The terminal device determines a transmit beam based on the beam indication priority configuration information.

In uplink communication, if a plurality of beam indications of the terminal device take effect at the same time, the terminal device needs to determine the transmit beam of the terminal device based on a predefined or preconfigured priority. The same time may be within one OFDM symbol time. The plurality of beam indications herein include the data channel beam indication, the control channel beam indication, the random access channel beam indication, and the channel sounding signal beam indication. In this embodiment, the network device sends the beam indication priority configuration information to the terminal device. The beam indication priority configuration information includes the priorities of the at least two of the following beam indications: the data channel beam indication, the control channel beam indication, the random access channel beam indication, and the channel sounding signal beam indication.

The reference signal includes at least one of the following types of reference signals: a periodic reference signal, a semi-persistent reference signal, and an aperiodic reference signal.

After receiving the beam indication priority configuration information sent by the network device, the terminal device needs to send data preferentially by using a transmit beam corresponding to a beam indication with a higher priority.

According to the communication method provided in this embodiment of this application, priorities of beam indications of a plurality of transmit beams are specified. In the uplink communication, if the beam indications of the transmit beams collide, the transmit beam can be determined based on the priorities of the beam indications.

Figure 9:
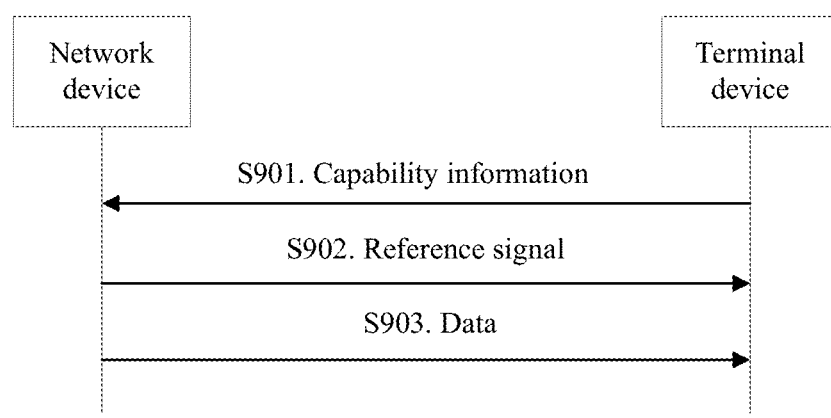
FIG. 9 is a schematic interaction flowchart of still another communication method according to an embodiment of this application.

FIG. 9 is a schematic interaction flowchart of still another communication method according to an embodiment of this application. The method may include the following steps.

S901. A terminal device reports capability information to a network device, where the capability information is used to indicate that the terminal device has a multibeam reception capability. The network device receives the capability information reported by the terminal device.

S902. The network device sends a reference signal to the terminal device. The terminal device receives, by using a first beam, the reference signal sent by the network device.

S903. The network device sends data to the terminal device. The terminal device receives, by using a second beam, the data sent by the network device.

Figure 10:
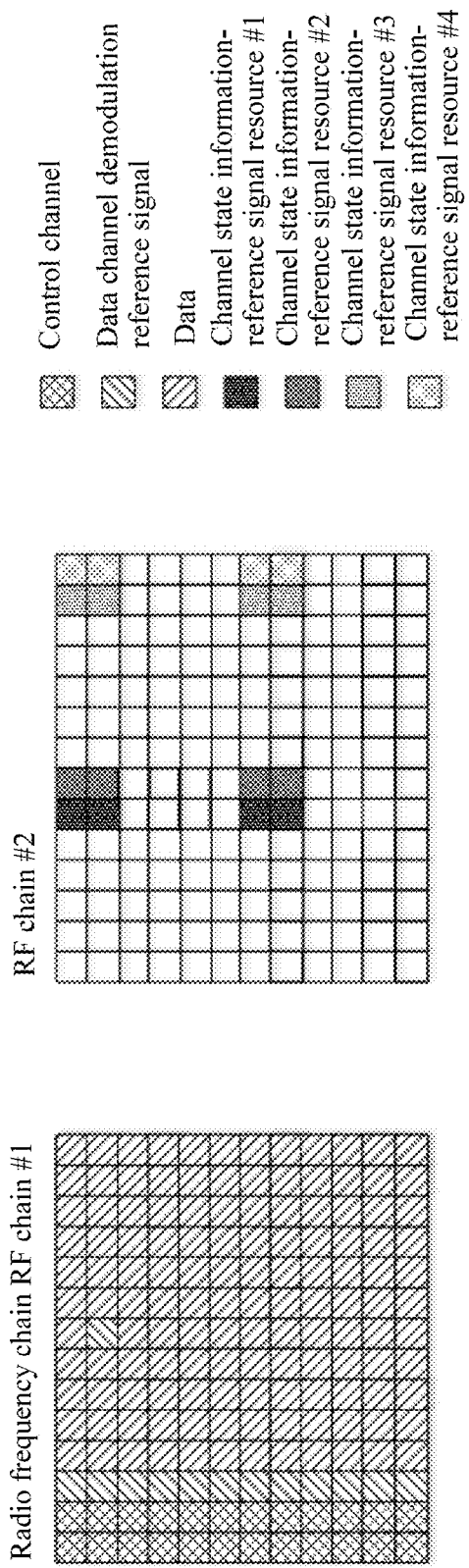
FIG. 10 is a schematic diagram of another mapping of time-frequency resources of a reference signal and data.

In this embodiment, because the terminal device has the multibeam reception capability, when the network device maps data and a reference signal, the network device may map the data to another resource element on an OFDM symbol onto which the reference signal is mapped. The terminal device may separately measure the reference signal and receive the data by using different beams. FIG. 10 is a schematic diagram of still another mapping of time-frequency resources of a reference signal and data. If space division performance of a plurality of beams is relatively good, the network device may configure the terminal device to perform data communication by using a beam, or referred to as a radio frequency chain (RF Chain), and to measure a reference signal by using another beam or another RF chain. In this case, there is no problem of frequency division multiplexing of the data and the reference signal. Therefore, there is no problem of selecting a beam from beam indications that collide and no problem of a data mapping manner.

The terminal device may report the capability information by using RRC signaling or the like.

According to the communication method provided in this embodiment of this application, the terminal device reports the capability information to the network device, the network device may map the data to the another resource element on the OFDM symbol onto which the reference signal is mapped, and the terminal device can accurately receive the reference signal and the data by using different beams.

The method of the embodiments of this application is described in detail above. An apparatus of the embodiments of this application is provided below.

Figure 11:
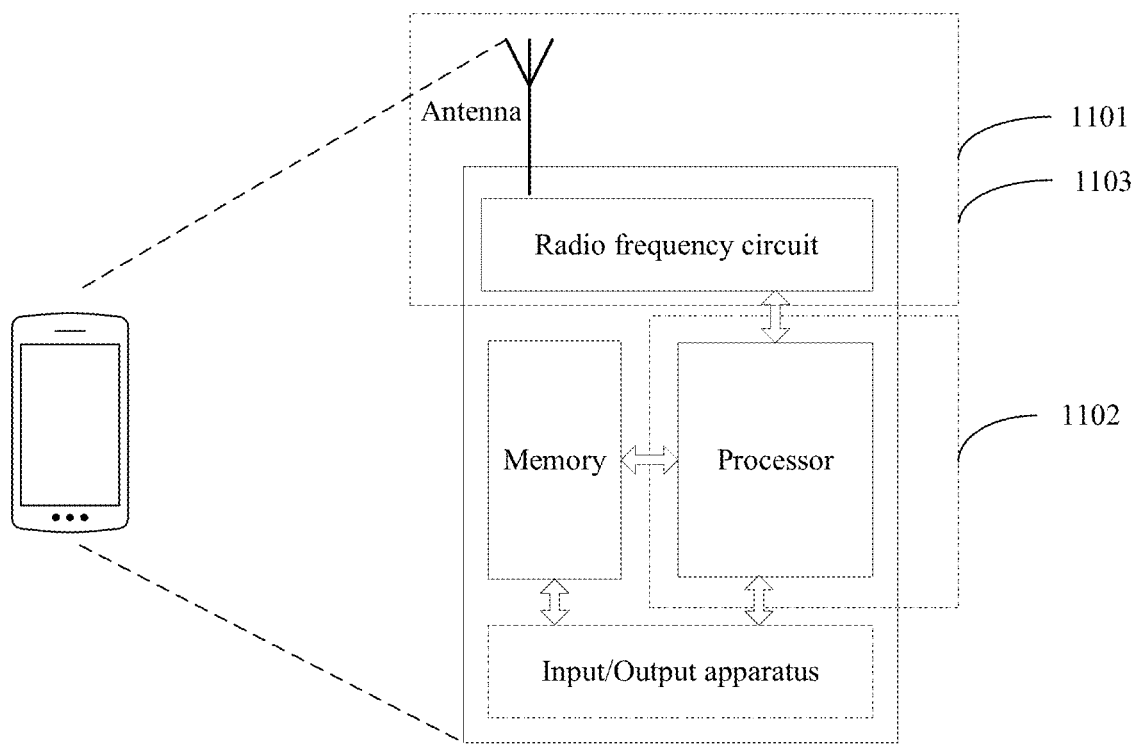
FIG. 11 is a schematic diagram of a simplified hardware architecture of a terminal device according to an embodiment of this application.

FIG. 11 is a schematic diagram of a simplified structure of a terminal device. For ease of understanding and illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display screen, or a keyboard, is mainly configured to receive data entered by a user and output data to the user. It should be noted that, some types of terminal devices may not include an input/output apparatus.

When data needs to be sent, the processor performs baseband processing on the to-be-sent data, and outputs a baseband signal to the radio frequency circuit. The radio frequency circuit performs radio frequency processing on the baseband signal, and then sends a radio frequency signal through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a receiving unit and a sending unit (which may also be collectively referred to as a transceiver unit) of the terminal device, and the processor having a processing function may be considered as a processing unit of the terminal device. As shown in FIG. 11, a terminal device includes a receiving unit 1101, a processing unit 1102, and a sending unit 1103. The receiving unit 1101 may also be referred to as a receiver, a receiving circuit, or the like. The sending unit 1103 may also be referred to as a transmitter, a transmitting circuit, or the like. The processing unit may also be referred to as a processor, a processing board, a processing module, a processing apparatus, or the like.

For example, in an embodiment, the receiving unit 1101 is configured to perform steps S201 to S203 in the embodiment shown in FIG. 2, and the processing unit 1102 is configured to perform step S204 in the embodiment shown in FIG. 2.

For another example, in another embodiment, the receiving unit 1101 is configured to perform steps S701, S703, and S704 in the embodiment shown in FIG. 7, and the processing unit 1102 is configured to perform step S702 in the embodiment shown in FIG. 7.

For another example, in still another embodiment, the receiving unit 1101 is configured to perform step S801 in the embodiment shown in FIG. 8, and the processing unit 1102 is configured to perform step S802 in the embodiment shown in FIG. 8.

For another example, in still another embodiment, the sending unit 1103 is configured to perform step S901 in the embodiment shown in FIG. 9, and the receiving unit 1101 is configured to perform steps S902 and S903 in the embodiment shown in FIG. 9.

Figure 13:
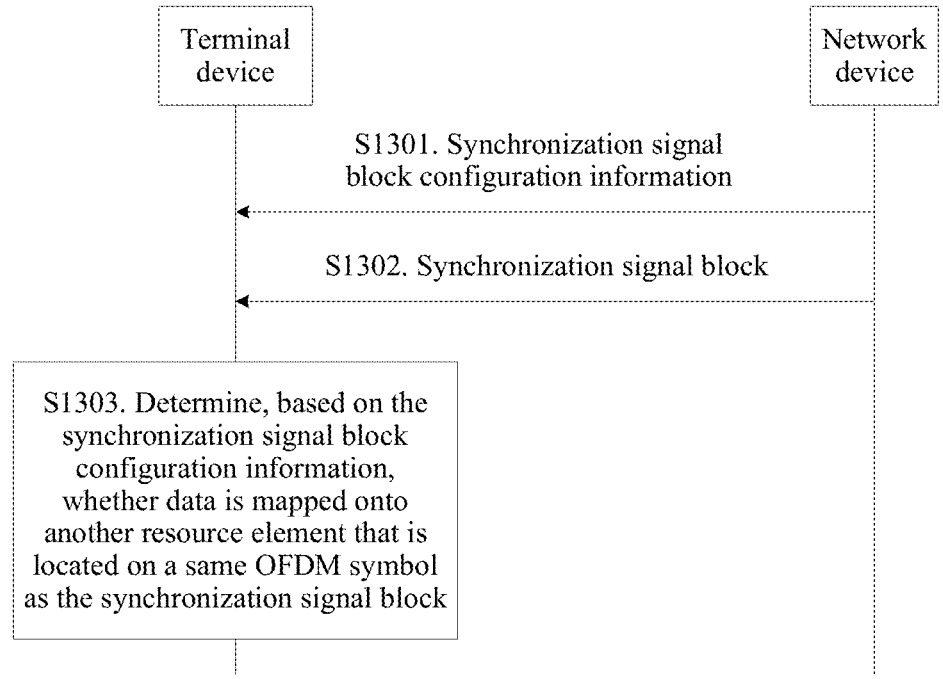
FIG. 13 is a schematic interaction flowchart of still another communication method according to an embodiment of this application.

For another example, in still another embodiment, the receiving unit 1101 is configured to perform the function of the terminal device in steps S1301 and S1302 in the embodiment shown in FIG. 13, and the processing unit 1102 is configured to perform step S1303 in the embodiment shown in FIG. 13.

Figure 12:
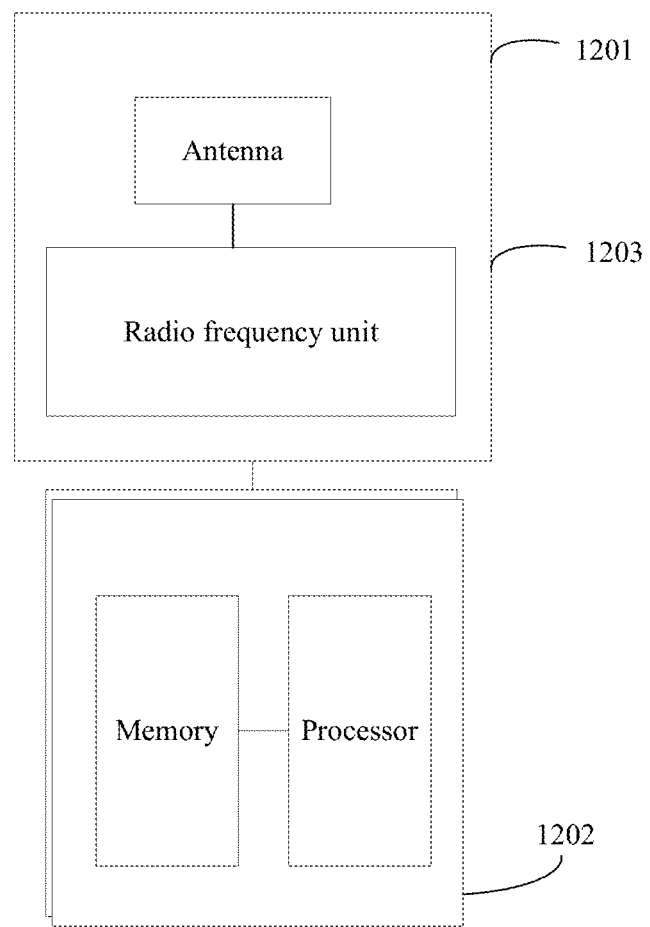
FIG. 12 is a schematic diagram of a simplified hardware architecture of a network device according to an embodiment of this application.

FIG. 12 is a schematic diagram of a simplified structure of a network device. The network device includes a radio frequency signal transceiving and conversion portion and a portion 1202. The radio frequency signal transceiving and conversion portion further includes a receiving unit 1201 and a sending unit 1203 (which may be collectively referred to as a transceiver unit). The radio frequency signal transceiving and conversion portion is mainly configured to receive and send a radio frequency signal, and perform conversion between the radio frequency signal and a baseband signal. The portion 1202 is mainly configured to perform baseband processing, control the network device, and so on. The receiving unit 1201 may also be referred to as a receiver, a receiving circuit, or the like. The sending unit 1203 may also be referred to as a transmitter, a transmitting circuit, or the like. The portion 1202 is usually a control center of the network device, and usually may be referred to as a processing unit, configured to control the network device to perform a step performed by the network device in FIG. 2, FIG. 7 to FIG. 9, or FIG. 13. For details, refer to the descriptions of related parts above.

The portion 1202 may include one or more boards. Each board may include one or more processors and one or more memories. The processor is configured to read and execute a program in the memory, to implement a baseband processing function and control the network device. If there are a plurality of boards, the boards may be interconnected to enhance a processing capability. In an optional implementation, a plurality of boards may share one or more processors, or a plurality of boards share one or more memories, or a plurality of boards share one or more processors.

For example, in an embodiment, the sending unit 1203 is configured to perform steps S201 to S203 in the embodiment shown in FIG. 2.

For another example, in another embodiment, the sending unit 1203 is configured to perform steps S701, S703, and S704 in the embodiment shown in FIG. 7.

For another example, in still another embodiment, the sending unit 1203 is configured to perform step S801 in the embodiment shown in FIG. 8.

For another example, in still another embodiment, the receiving unit 1201 is configured to perform step S901 in the embodiment shown in FIG. 9, and the sending unit 1203 is configured to perform steps S902 and S903 in the embodiment shown in FIG. 9.

For another example, in still another embodiment, the sending unit 1203 is configured to perform functions of the network device in steps S1301 and S1302 in the embodiment shown in FIG. 13.

In another optional implementation, with development of a system-on-chip (SoC for short) technology, all or some functions of the portion 1202 and the portion 1201 may be implemented by using the SoC technology, for example, implemented by a base station function chip. The base station function chip integrates devices such as a processor, a memory, and an antenna interface. A program of a related function of a base station is stored in the memory. The processor executes the program to implement the related function of the base station. Optionally, the base station function chip can further read a memory outside the chip to implement a related function of a base station.

FIG. 13 is a schematic interaction flowchart of still another communication method according to an embodiment of this application. The method may include the following steps.

S1301. A network device sends synchronization signal block configuration information to a terminal device. The terminal device receives the synchronization signal block configuration information.

S1302. The network device sends a synchronization signal block to the terminal device based on the synchronization signal block configuration information. The terminal device receives the synchronization signal block.

S1303. The terminal device determines, based on the synchronization signal block configuration information, whether data is mapped onto another resource element that is located on a same orthogonal frequency division multiplexing (OFDM) symbol as the synchronization signal block.

Figure 14:
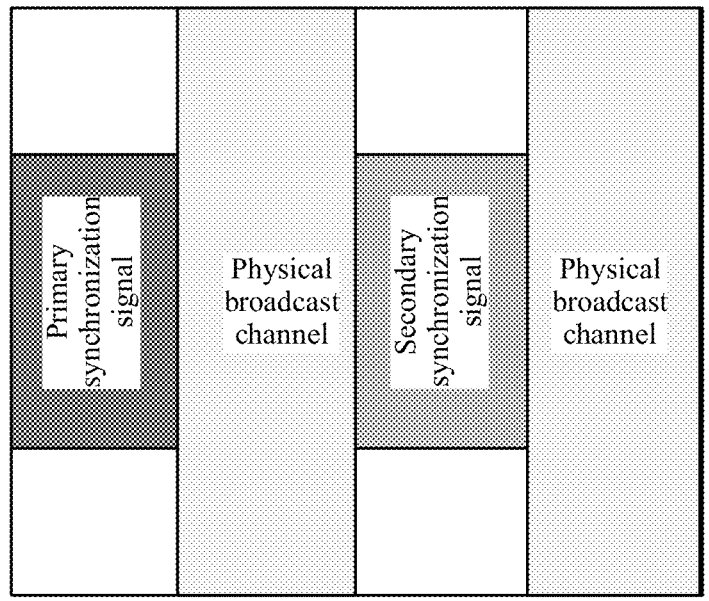
FIG. 14 is a schematic diagram of a signal structure of a synchronization signal block.

The network device sends the synchronization signal block (SSB) and a reference signal such as a CSI-RS to perform beam training and beam quality measurement. FIG. 14 is a schematic diagram of a signal structure of a synchronization signal block. The synchronization signal block includes a primary synchronization signal (PSS), a secondary synchronization signal (SSS), and a physical broadcast channel (PBCH). Alternatively, the synchronization signal block may include a PSS symbol, an SSS symbol, and a PBCH symbol. The PSS and the SSS are mainly used to help the terminal device identify a cell and synchronize with the cell. The PBCH includes most basic system information, for example, a system frame number or intra-frame timing information. Successful reception of the synchronization signal block by the terminal device is a prerequisite for the terminal device to access the cell. In the structure of the synchronization signal block shown in FIG. 14, the PSS and the SSS each occupy one orthogonal frequency division multiplexing (OFDM) symbol, the PBCH occupies two OFDM symbols, and the PBCH occupies approximately twice a bandwidth of the PSS/SSS. The terminal device may receive, on different OFDM symbols by using different receive beams, the signals included in the foregoing synchronization signal block.

When the synchronization signal block is used to manage a beam, the synchronization signal block may be used to select a beam and measure beam quality. In other words, there are two functions: beam selection (that is, beam training) and beam quality measurement. For selecting a beam, that is, training a receive beam, by using the synchronization signal block, beam quality usually does not need to be reported. However, for measuring beam quality by using the synchronization signal block, the beam quality needs to be reported. Therefore, the synchronization signal block configuration information includes: the synchronization signal block is configured as a beam management resource and no beam quality needs to be reported, and/or the synchronization signal block is configured as a beam management resource and beam quality needs to be reported. If no beam quality needs to be reported, a report amount in a report configuration configured by the network device for the terminal device is set to no report. One or more functions may be configured for one synchronization signal block. Therefore, being configured as a beam management resource includes at least being configured as a beam management resource.

For a configuration of the synchronization signal block on a time-frequency resource, refer to a configuration of a CSI-RS time-frequency resource in the foregoing embodiment. Similar to a configuration of the reference signal in the foregoing embodiment, both efficient use of time-frequency resources and accurate data reception are considered in this embodiment.

For the case in which the synchronization signal block is configured as the beam management resource and no beam quality needs to be reported, that is, a receive beam is trained, the receive beam cannot be determined, and the synchronization signal block is used by the terminal device only to select the receive beam. Therefore, the synchronization signal block and data are not allowed to multiplex an OFDM symbol on which the synchronization signal block is located. In other words, no data is mapped onto the another resource element that is located on the same OFDM symbol as the synchronization signal block. The terminal device may determine, based on the received synchronization signal block configuration information, that no data is mapped onto the another resource element that is located on the same OFDM symbol as the synchronization signal block, so that no data is to be received on the OFDM symbol.

For the case in which the synchronization signal block is configured as the beam management resource and the beam quality needs to be reported, that is, beam quality is measured, because the terminal device needs to report the beam quality, a beam pair for communication is already trained, and the communication is normal. To enable the time-frequency resource to be effectively used, the synchronization signal block and the data may be allowed to multiplex an OFDM symbol on which the synchronization signal block is located, that is, data may be mapped onto the another resource element that is located on the same OFDM symbol as the synchronization signal block. If the network device sends data on these symbols, the terminal device may determine, based on the received synchronization signal block configuration information, that data is mapped onto the another resource element that is located on the same OFDM symbol as the synchronization signal block, so that data is to be received on the OFDM symbol.

The data may be broadcast-type data, for example, paging data, system message update data, or cell-specific data, or may be UE-specific data, unicast data, or data scheduled by using terminal device-specific downlink control information (DCI).

Further, for the case in which a receive beam is trained by receiving the synchronization signal block, that is, the synchronization signal block is configured as the beam management resource and no beam quality needs to be reported, the terminal device may be allowed to switch the receive beam, in other words, the terminal device does not need to assume that a same receive beam is used to receive ing, semi-persistent reporting, or aperiodic reporting; or a reporting resource, for example, reporting by using an uplink control channel (for example: PUCCH), or reporting by using an uplink data channel (for example: PUSCH).

One or more report settings may be configured for one synchronization signal block. Therefore, configuring that no beam quality needs to be reported includes: at least one report setting is that no beam quality needs to be reported or all report settings are that no beam quality needs to be reported.

A specific representation manner in which the synchronization signal block is configured as the beam management resource may be configuring a number of a synchronization signal block into a number list of one or more synchronization signal blocks, as shown below:

```
CSI-ResourceConfig::=                    SEQUENCE {
    csi-ResourceConfigId                 CSI-ResourceConfigId,
    csi-RS-ResourceSetList               CHOICE {
        nzp-CSI-RS-SSB                       SEQUENCE {
            nzp-CSI-RS-ResourceSetList           SEQUENCE       (SIZE
(1..maxNrofNZP-CSI-RS-ResourceSetsPerConfig))    OF       NZP-CSI-RS-ResourceSetId
OPTIONAL,
            csi-SSB-ResourceSetList              SEQUENCE       (SIZE
(1..maxNrofCSI-SSB-ResourceSetsPerConfig)) OF CSI-SSB-ResourceSetId   OPTIONAL
        },
        csi-IM-ResourceSetList               SEQUENCE       (SIZE
(1..maxNrofCSI-IM-ResourceSetsPerConfig)) OF CSI-IM-ResourceSetId
    },
    bwp-Id                                BWP-Id,
    resourceType                          ENUMERATED         {aperiodic,
semiPersistent, periodic},
    ...
}
``` a plurality of synchronization signal blocks or a plurality of symbols in one synchronization signal block. For example, the terminal device may perform beam training by using the plurality of signals included in the synchronization signal block in FIG. 14.

For the case in which the beam quality is measured by receiving the synchronization signal block, that is, the synchronization signal block is configured as the beam management resource and the beam quality needs to be reported, the terminal device is not allowed to switch the receive beam, in other words, the terminal device may assume that a same receive beam is used to receive a plurality of synchronization signal blocks or a plurality of symbols in one synchronization signal block.

In addition, the synchronization signal block may be configured as the beam management resource in the following two manners. In one manner, the beam management resource may be a resource configured by the network device for the terminal device to calculate layer-1 reference signal received power (L1-RSRP). In the other manner, the beam management resource may be alternatively a resource in only one resource setting that is configured by the network device for the terminal device. As stipulated in an existing protocol, if a report setting is associated with only one resource setting, the resource setting is used for beam management. The report setting includes at least one of: a report amount, for example, report beam information {channel state information-reference signal resource indicator (CSI-RS resource indicator, CRI)/L1-RSRP} or {synchronization signal block index (SSB index)/L1-RSRP}, or CSI information {CRI/rank indicator (RI)/precoding matrix indicator (PMI)/channel quality indicator (CQI)}, or no report; a report time domain behavior, for example, periodic report- In an alternative implementation, it may be alternatively configured that data is allowed to be transmitted on none of OFDM symbols on which synchronization signal blocks used for beam management are located, that is, whether beam quality needs to be reported is not considered.

In another embodiment, synchronization signal blocks may be classified into a cell-defining synchronization signal block (cell-defining SSB) and a non cell-defining synchronization signal block (non cell-defining SSB). The cell-defining synchronization signal block carries system information, whereas the non cell-defining synchronization signal block does not carry system information. Because the cell-defining synchronization signal block carries the system information, the terminal device needs to receive the cell-defining synchronization signal block. The cell-defining synchronization signal block and data are allowed to multiplex an OFDM symbol on which the cell-defining synchronization signal block is located. To be specific, if the synchronization signal block configuration information received by the terminal device includes an index of the cell-defining synchronization signal block, the terminal device may determine that data may be mapped onto another resource element that is located on a same OFDM symbol as the cell-defining synchronization signal block, and the terminal device receives data on the OFDM symbol.

The non cell-defining synchronization signal block may be a terminal device-specific synchronization signal block. The non cell-defining synchronization signal block and data are not allowed to multiplex an OFDM symbol on which the non cell-defining synchronization signal block is located. To be specific, if the synchronization signal block configuration information received by the terminal device includes an index of the non cell-defining synchronization signal block, the terminal device may determine that no data is mapped onto another resource element that is located on a same OFDM symbol as the non cell-defining synchronization signal block, and the terminal device does not receive data on the OFDM symbol.

Further, the cell-defining synchronization signal block is a synchronization signal block that needs to be received by the terminal device in the cell. Therefore, the terminal device is not allowed to switch the receive beam. In other words, the terminal device may assume that a same receive beam is used to receive a plurality of synchronization signal blocks or a plurality of symbols in one synchronization signal block. For the non cell-defining synchronization signal block, the terminal device is allowed to switch the receive beam. In other words, the terminal device does not need to assume that a same receive beam is used to receive a plurality of synchronization signal blocks or a plurality of symbols in one synchronization signal block.

In another embodiment, when the synchronization signal block is configured as at least one of the following functions: link monitoring, beam failure monitoring, and the like, the terminal device may determine that no data is mapped onto the another resource element that is located on the same OFDM symbol as the synchronization signal block.

A manner in which the synchronization signal block is configured as link monitoring may be configuring a number of the synchronization signal block into a list of signals used for link monitoring.

A manner in which the synchronization signal block is configured as beam failure monitoring may be configuring a number of the synchronization signal block into a list of signals used for beam failure monitoring.

A function of the synchronization signal block may be alternatively explicitly indicated by the network device.

Optionally, the terminal device may alternatively feed back, to the network device, a synchronization signal function that can be supported by the terminal device. For example, the terminal device may feed back that the terminal device can support link monitoring that is performed by using a synchronization signal. Alternatively, the terminal device may feed back that the terminal device supports link monitoring and beam failure monitoring that are performed by using a synchronization signal. Alternatively, the terminal device may feed back that the terminal device supports beam management, link monitoring, and beam failure monitoring that are performed by using a synchronization signal.

The data in the foregoing embodiment is usually information on a physical downlink shared channel (PDSCH) or a physical downlink control channel (PDCCH).

According to the communication method provided in this embodiment of this application, the terminal device may determine, based on the synchronization signal block configuration information, whether data is mapped onto the another resource element that is located on the same OFDM symbol as the synchronization signal block, thereby accurately receiving data, and implementing efficient use of time-frequency resources.

In another embodiment, a dedicated time period may be reserved for beam training. In other words, a beam training time window is introduced. Within the time window, the terminal device may sweep the receive beam of the terminal device. Within the time window, the terminal device needs to assume that no data is transmitted on a symbol on which a reference signal/synchronization signal block used for beam management is located.

Further, a configuration of the time window may include:
(1) a start time and a length,
which may be separately configured by the network device; or
may be related to a time domain configuration of a beam training resource, where the time domain configuration includes a period, an offset, and the like; and
(2) a time domain behavior,
which may be periodic, where, for example, there is one beam training time window every 20 milliseconds; or
may be semi-persistent, where, for example, after a base station sends an activation command, there is one beam training time window every 20 milliseconds, and before the base station sends the activation command or after the base station sends a deactivation command, there is no beam training time window; or
may be aperiodic, and is a one-off time window that is triggered by a base station or requested by UE and that is used for beam training.

A configuration of the base station may be notified to the UE by using signaling such as a system message/a broadcast message/RRC/a MAC-CE/DCI. A request of the UE may be notified to the base station through an uplink control channel or an uplink data channel.

Within a time window, the terminal device may assume that no data is mapped onto the symbol on which the reference signal/synchronization signal block is located. The terminal device may evaluate the beam quality within the time window. For example, the terminal device may perform an operation such as averaging or filtering on a measurement result within a time window. Measurement includes L1-RSRP measurement. The terminal device cannot perform an operation such as averaging or filtering on a measurement result outside the time window.

In the foregoing embodiment, two downlink signals, namely, the CSI-RS and the synchronization signal block, are used as examples to describe determining, based on the CSI-RS configuration information or the synchronization signal block configuration information, whether data is mapped onto the another resource element that is located on the same OFDM symbol as the downlink signal. The downlink signal further includes any one of a broadcast channel, a broadcast channel demodulation signal, a cell-specific reference signal (CS-RS), a UE-specific reference signal (user equipment specific reference signal, US-RS), a downlink control channel demodulation reference signal, a downlink data channel demodulation reference signal, and a downlink phase noise tracking signal. To be specific, this application further provides a communication method, including: receiving, by a terminal device, downlink signal configuration information sent by a network device; receiving, by the terminal device, a downlink signal sent by the network device; and determining, by the terminal device based on the downlink signal configuration information, whether data is mapped onto another resource element that is located on a same orthogonal frequency division multiplexing (OFDM) symbol as the downlink signal.

The methods in this application are also applicable to uplink transmission. For example, when an uplink sounding reference signal (SRS) is configured as a specific function, for example, at least one of the following: beam management, antenna switching, codebook transmission, or non-codebook transmission, the terminal device is not allowed to send data on a symbol on which the SRS is located. Correspondingly, the network device needs to assume that there is no uplink data on the symbol. The uplink data is usually information on a physical uplink shared channel (PUSCH) or a physical uplink control channel (PUCCH). An uplink signal includes any one of an uplink random access sequence, an uplink sounding reference signal, an uplink control channel demodulation reference signal, an uplink data channel demodulation reference signal, or an uplink phase noise tracking signal. To be specific, this application further provides a communication method, including: receiving an uplink signal sent by a terminal device; and determining, based on configuration information of the uplink signal, whether data is mapped onto another resource element that is located on a same orthogonal frequency division multiplexing (OFDM) symbol as the uplink signal.

The network device and the terminal device in the apparatus embodiments fully correspond to the network device or the terminal device in the method embodiments. A corresponding module or unit performs a corresponding step. For example, a sending module (a transmitter) performs a sending step in the method embodiments, a receiving module (a receiver) performs a receiving step in the method embodiments, and steps other than sending and receiving may be performed by a processing module (a processor). For a function of a specific module, refer to the corresponding method embodiments. The sending module and the receiving module may constitute a transceiver module, and the transmitter and the receiver may constitute a transceiver, to jointly implement sending and receiving functions. There may be one or more processors.

A person of ordinary skill in the art may be aware that, with reference to the examples described in the embodiments disclosed in this specification, units and algorithm steps can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, the procedures or functions according to the embodiments of this application are all or partially generated. The computer may be a general-purpose computer, a dedicated computer, a computer network, or another programmable apparatus. The computer program instructions may be stored in a computer readable storage medium, or may be transmitted by using the computer readable storage medium. The computer program instructions may be transmitted from a website, computer, server, or data center to another website, computer, server, or data center in a wired manner (for example, by using a coaxial cable, an optical fiber, or a digital subscriber line (DSL)) or in a wireless (such as infrared, wireless, or microwave) manner. The computer readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the procedures of the methods in the embodiments may be implemented by a computer program instructing relevant hardware. The program may be stored in a computer readable storage medium. When the program runs, the procedures in the method embodiments are performed. The storage medium includes any medium that can store program code, such as a read-only memory (ROM), a random access memory (RAM), a magnetic disk, or a compact disc.

What is claimed is:

1. A communication method, comprising:
   receiving, by a terminal device, reference signal configuration information from a network device, wherein the reference signal configuration information comprises the following information: a beam sweeping type and a reference signal beam indication;
   receiving, by the terminal device, a reference signal and data from the network device; and
   determining, by the terminal device based on the reference signal configuration information, whether data can be mapped onto another resource element that is located on a same orthogonal frequency division multiplexing (OFDM) symbol as the reference signal;
   wherein the determining, by the terminal device based on the reference signal configuration information, whether data can be mapped onto another resource element that is located on a same OFDM symbol as the reference signal comprises at least one of:
      if the beam sweeping type comprises at least one of sweeping a receive beam or not sweeping a transmit beam, determining, by the terminal device, that no data can be mapped onto the another resource element that is located on the same OFDM symbol as the reference signal; or if the beam sweeping type comprises at least one of sweeping a transmit beam or not sweeping a receive beam, and the reference signal beam indication is the same as a beam indication of the data, determining, by the terminal device, that data can be mapped onto the another resource element that is located on the same OFDM symbol as the reference signal; or if the reference signal beam indication is different from a beam indication of the data, determining, by the terminal device, that no data can be mapped onto the another resource element that is located on the same OFDM symbol as the reference signal.

2. The method according to claim 1, wherein the data is information on a physical downlink shared channel or a physical downlink control channel.

3. A communications apparatus, comprising:
a receiver;
at least one processor; and
one or more memories coupled to the at least one processor and storing programming instructions for execution by the at least one processor to cause the apparatus to:
receive, by using the receiver, reference signal configuration information from a network device, wherein the reference signal configuration information comprises the following information: a beam sweeping type and a reference signal beam indication, wherein
receive, by using the receiver, a reference signal and data from the network device; and
determine, based on the reference signal configuration information, whether data can be mapped onto another resource element that is located on a same orthogonal frequency division multiplexing (OFDM) symbol as the reference signal; wherein the determination of whether data can be mapped onto another resource element that is located on a same OFDM symbol as the reference signal comprises at least one of:
if the beam sweeping type comprises at least one of sweeping a receive beam or not sweeping a transmit beam, a determination that no data can be mapped onto the another resource element that is located on the same OFDM symbol as the reference signal; or
if the beam sweeping type comprises at least one of sweeping a transmit beam or not sweeping a receive beam, and the reference signal beam indication is the same as a beam indication of the data, a determination that that data can be mapped onto the another resource element that is located on the same OFDM symbol as the reference signal; or
if the reference signal beam indication is different from a beam indication of the data, a determination that that no data can be mapped onto the another resource element that is located on the same OFDM symbol as the reference signal.

4. The communications apparatus according to claim 3, wherein the data is information on a physical downlink shared channel or a physical downlink control channel.

5. A non-transitory computer-readable medium having processor-executable instructions stored thereon, the processor-executable instructions when executed by a computer, causes the computer to implement operations including:
receiving reference signal configuration information from a network device, wherein the reference signal configuration information comprises the following information: a beam sweeping type and a reference signal beam indication;
receiving a reference signal and data from the network device; and
determining, based on the reference signal configuration information, whether data can be mapped onto another resource element that is located on a same orthogonal frequency division multiplexing (OFDM) symbol as the reference signal; wherein the determining, based on the reference signal configuration information, whether data can be mapped onto another resource element that is located on a same OFDM symbol as the reference signal comprises at least one of:
if the beam sweeping type comprises at least one of sweeping a receive beam or not sweeping a transmit beam, determining that no data can be mapped onto the another resource element that is located on the same OFDM symbol as the reference signal; or
if the beam sweeping type comprises at least one of sweeping a transmit beam or not sweeping a receive beam, and the reference signal beam indication is the same as a beam indication of the data, determining that data can be mapped onto the another resource element that is located on the same OFDM symbol as the reference signal; or
if the reference signal beam indication is different from a beam indication of the data, determining that no data can be mapped onto the another resource element that is located on the same OFDM symbol as the reference signal.

6. The non-transitory computer-readable medium according to claim 5, wherein the data is information on a physical downlink shared channel or a physical downlink control channel.

7. A communications apparatus, comprising:
a processor, configured to execute computer program of a memory to performing operations that comprise:
receiving reference signal configuration information from a network device, wherein the reference signal configuration information comprises the following information: a beam sweeping type and a reference signal beam indication;
receiving a reference signal and data from the network device; and
determining, based on the reference signal configuration information, whether data can be mapped onto another resource element that is located on a same orthogonal frequency division multiplexing (OFDM) symbol as the reference signal; wherein the determining, based on the reference signal configuration information, whether data can be mapped onto another resource element that is located on a same OFDM symbol as the reference signal comprises at least one of:
if the beam sweeping type comprises at least one of sweeping a receive beam or not sweeping a transmit beam, determining that no data can be mapped onto the another resource element that is located on the same OFDM symbol as the reference signal; or
if the beam sweeping type comprises at least one of sweeping a transmit beam or not sweeping a receive beam, and the reference signal beam indication is the same as a beam indication of the data, determining that data can be mapped onto the another resource element that is located on the same OFDM symbol as the reference signal; or
if the reference signal beam indication is different from a beam indication of the data, determining that no data can be mapped onto the another resource element that is located on the same OFDM symbol as the reference signal.

8. The communications apparatus according to claim 7, wherein the data is information on a physical downlink shared channel or a physical downlink control channel.

\* \* \* \* \*

UNITED STATES PATENT AND TRADEMARK OFFICE
CERTIFICATE OF CORRECTION

PATENT NO. : 11,374,716 B2
APPLICATION NO. : 16/674683
DATED : June 28, 2022
INVENTOR(S) : Peng Guan and You Li It is certified that error appears in the above-identified patent and that said Letters Patent is hereby corrected as shown below:

In the Claims

Column 29/Line 48 - In Claim 3, delete "that that" and insert -- that --.

Column 29/Line 52-53 - In Claim 3, delete "that that" and insert -- that --.

Signed and Sealed this
Twenty-third Day of May, 2023

Katherine Kelly Vidal
*Director of the United States Patent and Trademark Office*